United States Patent [19]

Hooper et al.

[11] Patent Number: 4,553,439

[45] Date of Patent: Nov. 19, 1985

[54] APPARATUS FOR DEMODULATING GYROSCOPE POSITION INFORMATION

[75] Inventors: Ronald Hooper, Dahlgren; Kenneth Nichols, Fredericksburg, both of Va.

[73] Assignee: The United States of America as represented by the Secretary of the Navy, Washington, D.C.

[21] Appl. No.: 510,535

[22] Filed: Jul. 5, 1983

[51] Int. Cl.$^4$ .................. G01C 19/30; G01C 19/32
[52] U.S. Cl. ................................. 74/5.4; 74/5.6 D
[58] Field of Search .............. 74/5.4, 5.41, 5.46, 74/5.6 D; 318/580, 648

[56] References Cited

U.S. PATENT DOCUMENTS

| | | | |
|---|---|---|---|
| 3,444,745 | 5/1969 | Wing | 74/5.6 |
| 3,902,374 | 9/1975 | Hoffman et al. | 74/5.6 D |
| 3,955,426 | 5/1976 | Klinchuch | 74/5.6 D |
| 4,074,580 | 2/1978 | Boltinghouse et al. | 74/5.6 D |
| 4,179,087 | 12/1979 | Johnson | 74/5.6 D X |

Primary Examiner—Rodney H. Bonck
Attorney, Agent, or Firm—Robert F. Beers; Kenneth E. Walden; John G. Wynn

[57] ABSTRACT

A synchronous demodulator is configured so as to extract gyroscope position information in a polar coordinate format and then resolve it into position information in a more useful cartesian coordinate format. The technique involves integration of a gyroscope cage coil signal over integration intervals controlled by spin reference signals rather than by the commonly noisy cage coil signal. Integration of the cage coil signal over intervals controlled by the spin reference signals yields outputs of $\lambda \cos \theta$ and $\lambda \sin \theta$ which are subsequently sampled and held and then summed to produce a precession coil drive signal whose phase is in the proper relationship to make the gyroscope precess in the correct direction.

7 Claims, 2 Drawing Figures

APPARATUS FOR DEMODULATING GYROSCOPE POSITION INFORMATION

BACKGROUND OF THE INVENTION

1. Field of the Invention

The present invention relates to an apparatus for sychronously demodulating position information from a gyroscope, but more specifically it relates to an apparatus for transforming a cage coil signal portion of the position information which is in a polar coordinate format into a more useful cartesian coordinate format.

2. Description of the Prior Art

The present invention is contemplated for use with an associated gyroscope capable of generating from a cage coil portion thereof a cage coil signal consisting of an amplitude and phase modulated waveform having a carrier frequency which is the same as the inertial spin rate of the rotor of the associated gyroscope. Normally, the cage coil is disposed on the rotor of the gyroscope so that the amplitude of the cage coil signal is proportional to an angle $\lambda$ and the phase thereof is equal to an angle $\theta$. These two angles define the position of the rotor of the gyroscope in a polar coordinate system where the angle $\lambda$ is a measure of the rotor deflection relative to an axis which is coaxial with the cage coil and passes through its radius center. The angle $\theta$ is the solid angle determined by the two planes normal to the cage coil. One plane passes through the center of the rotor normal thereto, and the other plane, i.e., a spin reference plane, passes through a spin reference sensor disposed on the rotor. The spin reference plane also passes through the centroid of the cage coil. This plane is also termed the $\theta$-reference plane. The foregoing is a description of a typical gyroscope having a cage coil which generates position information in terms of a cage coil signal.

In many guidance applications, it is desirable to measure the gyroscope position with respect to a cartesian coordinate system established in the $\theta$-reference plane. The gyroscope position can then be described by $\lambda \cos \theta$ and $\lambda \sin \theta$. The cartesian x and y components then arise from the projection of $\lambda$ into the cartesian coordinate plane and its subsequent resolution into the x and y components.

In the methods employed by the prior art to measure $\lambda$, the cage coil signal is sampled after a fixed interval following the zero crossings thereof. The time interval used is T/4, where T is the period of the cage coil waveform. This technique is subject to error since the period of the cage coil waveform varies in most gyroscope applications. This is due to the fact that the frequency of the cage coil waveform changes if the vehicle containing the gyroscope undergoes rotation in the plane of the gyroscope's rotor. Errors will also arise when the speed of the rotor varies as is the case in spin down gyroscope applications. Hence, there is a need in the prior art to eliminate the errors in calculation due to frequency perturbations in the cage coil waveforms and to significantly desensitize the demodulation process to errors caused by varying rotor speed rates.

Yet another source of error in the measurement of $\lambda$ arises due to the necessity of having to instantaneously sample the cage coil waveform. Accordingly, any noise present on the cage coil waveform at the instant of sampling will become part of the measured response. This noise may be uncorrelated electrical interference. But more likely than not, the noise will be correlated signals which arise due to portions of the spin waveforms and precession waveforms of the associated gyroscope being coupled to the cage coil. The foregoing interfering waveforms have the same fundamental frequency as the cage coil waveform and they usually possess harmonics as well. The result is that the interfering signals slowly "walk" through the peaks of the cage coil waveform as it is sampled. In addition, these noise sources may also introduce error by causing the zero crossings of the cage coil waveform to occur at incorrect times. Consequently, there is a need in the prior art to reduce the effect of interference signals, i.e., noise, in the accuracy of measuring the value of $\lambda$.

The conventional technique for the measurement of the $\cos \theta$ and the $\sin \theta$ is similar to the measurement of $\lambda$. The spin reference waveforms from the spin reference sensors are sampled after a delay of T/4 following zero crossings of the cage coil signal. The sampled values of the spin reference waveforms are equal to the $\cos \theta$ and the $\sin \theta$ for the x and y axes spin reference sensors, respectively. Errors in the zero crossing time of the cage coil signal caused by noise will also affect the measurement of $\cos \theta$ and $\sin \theta$. Thus, there is a need in the prior art to reduce the effect of noise in the measurement of $\cos \theta$ and $\sin \theta$ in an improved manner.

As outlined hereinabove, the known prior art demodulation methods are quite susceptible to cage coil waveform noise and variations in the spin speed of the rotor of the associated gyroscope. The unwanted coupling of a portion of the spin and precession waveforms into the cage coil waveform is particularly troublesome. Additionally, prior art measurement accuracies are highly dependent on the actual value of $\lambda$. Accordingly, there is a need, as related to the foregoing types of systems, to reduce substantially the required accuracy of the demodulation process on the actual value of $\lambda$.

The prior art, as indicated hereinabove, include various apparatuses for demodulating position information from cage coil signals. However, insofar as can be determined, no prior art apparatus incorporates all of the features and advantages of the present invention.

OBJECTS OF THE INVENTION

Accordingly, a principal object of the present invention is to transform position information generated in a polar coordinate format into the more useful cartesian coordinate format in an improved manner.

Another object of the present invention is to measure the gyroscope position with respect to a cartesian coordinate system in the $\theta$-reference plane in an improved manner.

Yet another object of the present invention is to eliminate the errors in calculation due to frequency perturbations in the cage coil waveform in an improved manner.

Still another object of the present invention is to densensitize the demodulation process to errors caused by variations in the gyroscope rotor speed rates.

A further object of the present invention is to reduce the effect of interference signals on the accuracy of measuring the value of $\lambda$.

Yet a further object of the present invention is to reduce the effect of interference signals in the measurement of $\cos \theta$ and $\sin \theta$.

Yet still aother object of the present invention is to substantially reduce the required accuracy in the demodulation process of measuring the actual value of $\lambda$.

SUMMARY OF THE INVENTION

In accordance with the above stated objects, the primary purpose of the present invention is to configure an apparatus for demodulating the cage coil waveform of an associated gyroscope in an improved manner.

The essence of the present invention is in the novel technique used to extract gyroscope position information in a polar coordinate format and then resolving it into position information in a more useful cartesian coordinate format. The technique (a synchronous demodulation technique) involves integrating the cage coil waveform over intervals controlled by spin reference signals provided by the associated gyroscope.

The purpose of the present invention is carried out by continuously multiplying the cage coil waveform by the x-axis spin reference signal using an analog multiplier. The resulting signal is integrated by an analog integrator over one spin interval, T. The value of the output of the analog integrator at the end of the integration interval is explicitly $\lambda \cos \theta$. At the end of the integration interval, the output of the analog integrator is sampled and held by a sample/hold circuit. A control pulse timing network generates a sample pulse for proper operation of the sample/hold circuit and a reset pulse for resetting of the analog integrator to zero. The control pulse timing network is triggered by the x-axis and the y-axis spin reference signals. The process is then repeated. A similar process occurring concurrently uses the product of the cage coil waveform and the y-axis spin reference signal to yield $\lambda \sin \theta$.

BRIEF DESCRIPTION OF THE DRAWINGS

The previously stated objects, other objects, features and advantages of the present invention will be apparent from the following more particular description of the preferred embodiment as illustrated in the accompanying drawings, in which.

DESCRIPTION OF THE PREFERRED EMBODIMENT

Figure 1:
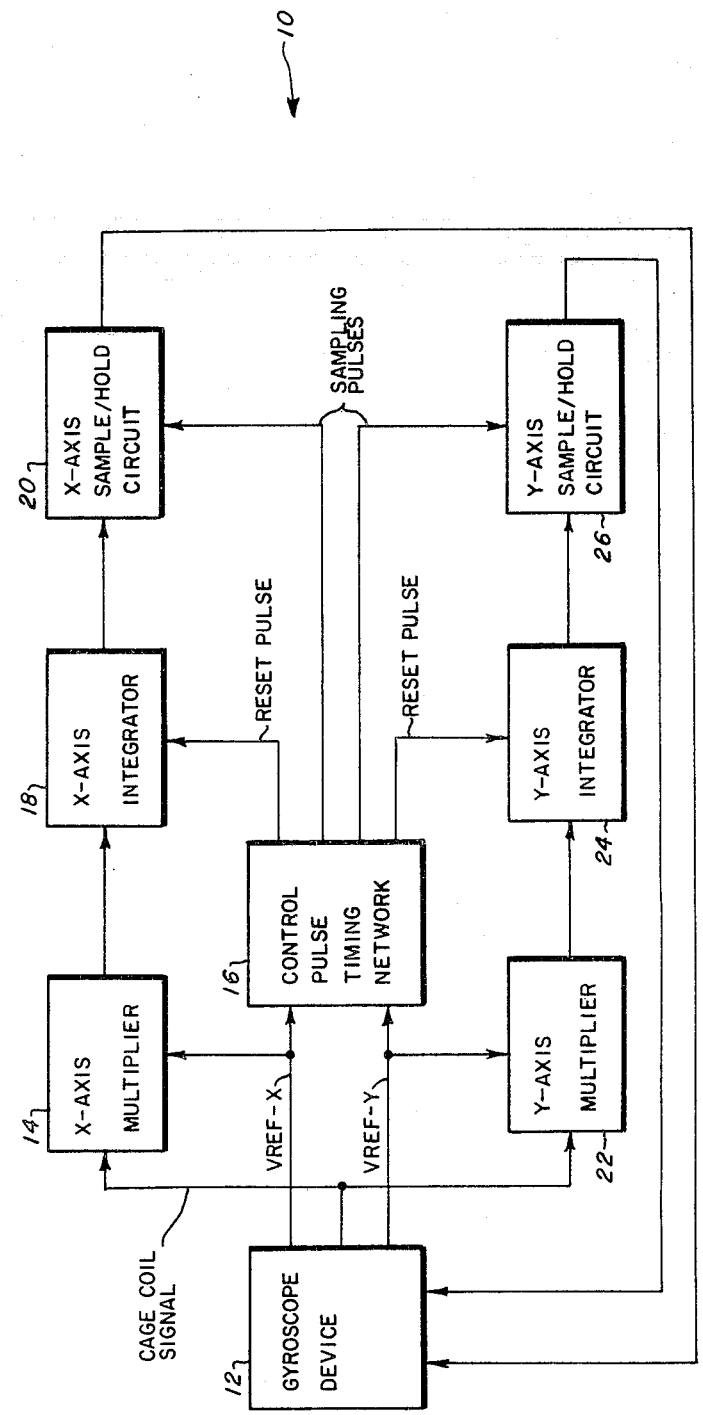
FIG. 1 is a block diagram representation of an apparatus for demodulating gyroscope position information according to the present invention.

FIG. 1 shows an embodiment of an apparatus 10 for demodulating gyroscope position information in which the present invention is employed to synchronously demodulate cage coil waveforms using spin reference signals of an associated gyroscope (not shown). Basically, the apparatus 10 comprises a gyroscope device 12 which provides cage coil and gyroscope spin reference signals. The cage coil signal output of the gyroscope device 12 is operatively connected to an x-axis multiplier 14. An x-axis gyroscope spin reference signal, VREF-X, from the gyroscope device 12 drives one input of a control pulse timing network 16. This same output of the gyroscope device 12 also drives another input of the x-axis multiplier 14. The output of the x-axis multiplier 14 drives an x-axis integrator 18. Another input of the x-axis integrator 18 is driven by reset pulses from the control pulse timing network 16. In turn, the output of the x-axis integrator 18 deives an x-axis sample/hold circuit 20. Sampling pulses from the control pulse timing network 16 drive another input of the x-axis sample/hold circuit 20 whose output is connected to one input of the gyroscope device 12.

Likewise, the cage coil signal output of the gyroscope device 12 also drives a y-axis multiplier 22. Correspondingly, the other input of y-axis multiplier 22 is driven by a y-axis gyroscope spin reference signal, VREF-Y, from the gyroscope device 12. This signal also drives the other input of the control pulse timing network 16. The output of the y-axis multiplier 20 drives a y-axis integrator 24 whose other input is driven by reset pulses from the control pulse timing network 16. In turn, the output of the y-axis integrator 24 drives a y-axis sample/hold circuit 26 which is driven at its other input by sampling pulses from the control pulse timing network 16. The output of the y-axis sample/hold circuit 26 drives the other input of the gyroscope device 12.

STATEMENT OF THE OPERATION

Figure 2:
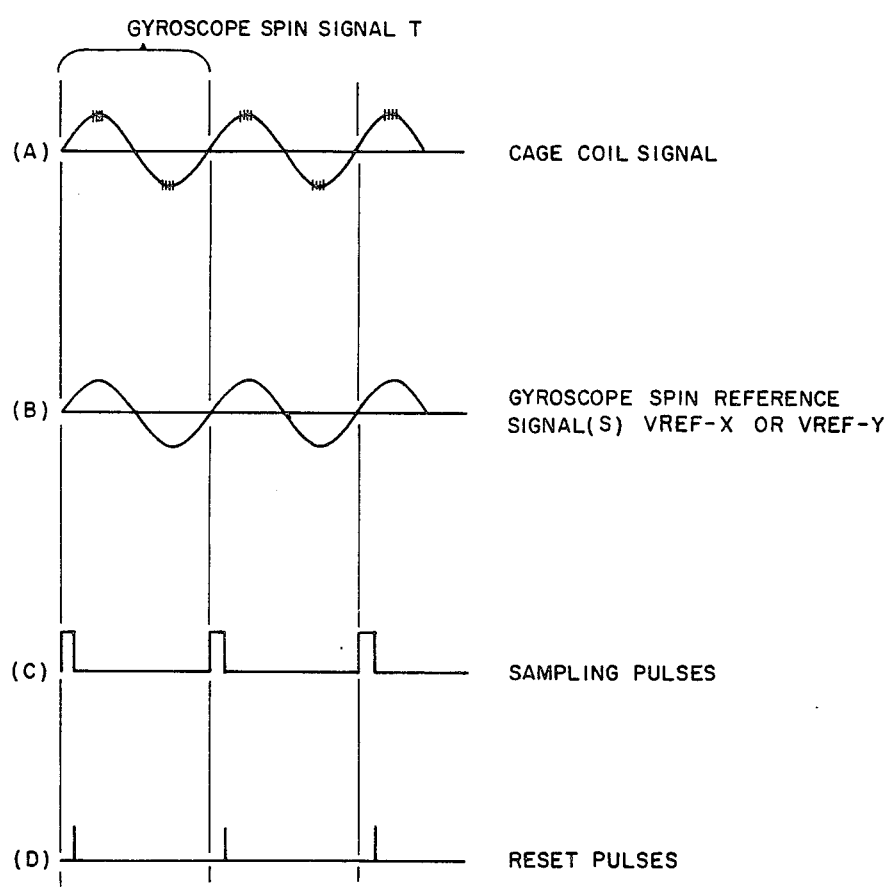
FIG. 2 is a waveform/timing diagram illustrating the sequential inter-relationship of various elements of the apparatus of FIG. 1. during the operation thereof.

Details of the operation, according to a preferred embodiment of the present invention, are explained in conjunction with FIGS. 1 and 2 viewed concurrently.

The present invention uses a synchronous demodulation technique which involves the integration of the cage coil signal over intervals which are controlled by the spin reference signals. For purposes of illustration assume, that the spin frequency of the rotor of the associated gyroscope is 100 Hz. Thus, cage coil signal generated, FIG. 2(A), is continuously multiplied by the x-axis spin reference signal, FIG. 2(B), in the x-axis multiplier 18. The resulting signal is integrated over one gyroscope spin period, T. The value of the output of the x-y axis integrator 18 at the end of the integration interval is explicity $\lambda \cos \theta$. At the end of the integration interval, the value of the output of the x-axis integrator 18 is sampled and held in the sample/hold circuit 20 at the rate of the sampling pulses, FIG. 2(C), generated by the control pulse timing network 16. This action is followed by the resetting of the x-axis integrator 18 to zero by reset pulses, FIG. 2(D), also from the control pulse timing network 16. The process is then repeated. A similar process using the product of the cage coil signal and the y-axis gyroscope spin reference signal, VREF-Y, yield $\lambda \sin \theta$ after multiplying in the y-axis multiplier 20 and integrating in the y-axis integrator 24. At the end of this integration interval, the output of the y-axis integrator 24 is sampled and held in the y-axis sample/hold circuit 26 followed by the resetting to zero of the y-axis integrator 24. The output of the y-axis sample/hold circuit 26, in turn, drives the other input of the gyroscope device 12.

The timing/waveform diagram of FIGS. 2(B) through 2(D) shows the timing control for one integrator and one sample/hold circuit. It should be mentioned that the spin reference signals, VREF-X and VREF-Y, are always 90° out of phase. For purposes of the present invention, and as shown in FIGS. 2(C) and 2(D), the sampling pulses are less than 5 $\mu$sec and the reset pulses, which follow immediately the sample pulses, are less than 2 $\mu$sec in duration, respectively. The sample/hold and reset functions introduce an insignificant dead interval of approximately 10 $\mu$sec. Also, for purposes of the present invention, the reset pulse function can be performed by analog switches of the control pulse timing network 16.

To continue, the circuitry associated with the control pulse timing network 16 can be implemented with two zero crossing detectors that provide transistor-transistor logic (TTL) compatible pulses with rising edges synchronous with positive slope zero crossings of the spin reference signals, VREF-X and VREF-Y. The rising edges of these TTL compatible pulses can each trigger one section of two separate dual digital monostable multivibrators. The output of the first sections of the dual multivibrators will be nominal 5 μsec pulses which command the sample/hold circuits 20 and 26 to update to the current output of the respective integrators 18 and 24. The falling edges of the 5 μsec pulses can be used to trigger the second stages of the dual multivibrators which also produce 5 μsec pulse-widths. These pulses can be used to close the reset switches within the integrators 18 and 24. Finally, since the spin reference signals, VREF-X and VREF-Y, are separated by 90° in phase, the timing events will always be separated by an interval equal to ¼ of the gyroscope spin period, T.

The two sine waves produced at the output of the x-axis sample/hold circuit 20 and the y-axis sample/hold circuit 26 when summed in gyroscope device 12 will produce a wave whose phase and amplitude are dependent on the phases and amplitudes of the two original waves. For example, if the original waves were of the same amplitude and were 90° out of phase, the resultant wave would be of that same amplitude, but it would lag the leading wave by 45° and lead the second wave by 45°. Consequently, the summed signal comprises a sine wave (precession coil drive signal) whose phase is in the proper relationship to make the associated gyroscope precess in the proper direction.

To those skilled in the art, many modifications and variations of the present invention are possible in light of the above teachings. It is therefore to be understood that the present invention can be practiced otherwise than as specifically decribed herein and still be within the spirit and scope of the appended claims.

What is claimed is:

1. An apparatus for demodulating position information from a gyroscope device including an associated gyroscope having a predetermined spin frequency, the position information consisting of a cage coil signal and a spin reference signal, said apparatus comprising:

first means operatively connected to said gyroscope device for multiplying the cage coil signal and the spin reference signal;

second means operatively connected to said first means for integrating over a predetermined integration interval the resulting signal from the output of said first means;

third means operatively connected to said second means for sampling and holding at the end of the predetermined integration interval the output signal of said second means; and fourth means operatively connected at its input to said gyroscope device and at its outputs to said second means and to said third means for generating a sample pulse for proper operation of said third means and a reset pulse for resetting of said second means to zero at a time slightly after the end of the predetermined integration interval.

2. The apparatus of claim 1 wherein said first means comprises an x-axis multiplier and a y-axis multiplier both operatively connected to the cage coil signal, said x-axis multiplier and said y-axis multiplier also being connected to x-axis and y-axis portions, respectively, of the spin reference signal.

3. The apparatus of claim 2 wherein the x-axis and y-axis portions of the spin reference signal are always 90° out of phase.

4. The apparatus of claim 3 wherein said second means comprises an x-axis integrator and a y-axis integrator each being operatively connected to outputs of said x-axis multiplier and said y-axis multiplier, respectively.

5. The apparatus of claim 4 wherein the predetermined integration interval is equal to one spin period of the associated gyroscope.

6. The apparatus of claim 5 wherein said third means comprises an x-axis sample/hold circuit and a y-axis sample/hold circuit each being operatively connected to outputs of sais x-axis integrator and said y-axes integrator, respectively, and both being operatively connected at their outputs to inputs of said gyroscope device so that the signals at their outputs can be summed in said gyroscope device to provide a precession drive signal for the associated gyroscope.

7. The apparatus of claim 6 wherein said fourth means is operatively connected at its input to the x-axis and the y-axis portions of the spin reference signal so as to generate in response to the x-axis portion thereof reset pulses for said x-axis integrator and sampling pulses for said x-axis sample/hold circuit, and so as to generate in response to the y-axis portion thereof reset pulses for said y-axis integrator and sampling pulses for said y-axis sample/hold circuit.

* * * * *